United States Patent
Radogna et al.

[11] Patent Number: 5,991,299
[45] Date of Patent: Nov. 23, 1999

[54] HIGH SPEED HEADER TRANSLATION PROCESSING

[75] Inventors: Thomas V. Radogna, Westborough; Leonard Schwartz, Bedford; John A. Flanders, Ashland, all of Mass.

[73] Assignee: 3COM Corporation, Santa Clara, Calif.

[21] Appl. No.: 08/927,649

[22] Filed: Sep. 11, 1997

[51] Int. Cl.[6] .................................................. H04L 12/28
[52] U.S. Cl. ......................... 370/392; 370/389; 370/401
[58] Field of Search .................................... 370/392, 401, 370/400, 391, 389, 409, 410, 415, 465, 466

[56] References Cited

U.S. PATENT DOCUMENTS

| | | | |
|---|---|---|---|
| 5,077,732 | 12/1991 | Fischer | 370/437 |
| 5,428,615 | 6/1995 | Backes | 370/392 |
| 5,651,002 | 7/1997 | Van Seters | 370/392 |
| 5,729,543 | 3/1998 | Weigand | 370/350 |
| 5,732,081 | 3/1998 | Grenot | 370/392 |
| 5,825,774 | 10/1998 | Ready et al. | 370/401 |

*Primary Examiner*—Ajit Patel
*Assistant Examiner*—Ricardo M. Pizarro
*Attorney, Agent, or Firm*—Weingarten, Schurgin, Gagnebin & Hayes LLP

[57] ABSTRACT

A method and apparatus is disclosed for translating data link layer and network layer frame headers at speeds approximating the reception rate of frames on respective communication links. High-speed header translation is achieved via the use of a dedicated microsequencer which identifies the receive frame encapsulation type and the transmit frame encapsulation type and based on such identification, selects a processing routine which is then executed to translate the frame header. The microsequencer is employed to control the movement of control information and frame header and payload information from an input FIFO, through the dedicated header processor, and to an output FIFO. The headers of the respective frames are translated within the dedicated header processor to facilitate header translation at high speeds. Via use of the presently disclosed header translation apparatus, layer 2 and layer 3 header translations, as well as other header translation functions may be rapidly performed.

3 Claims, 8 Drawing Sheets

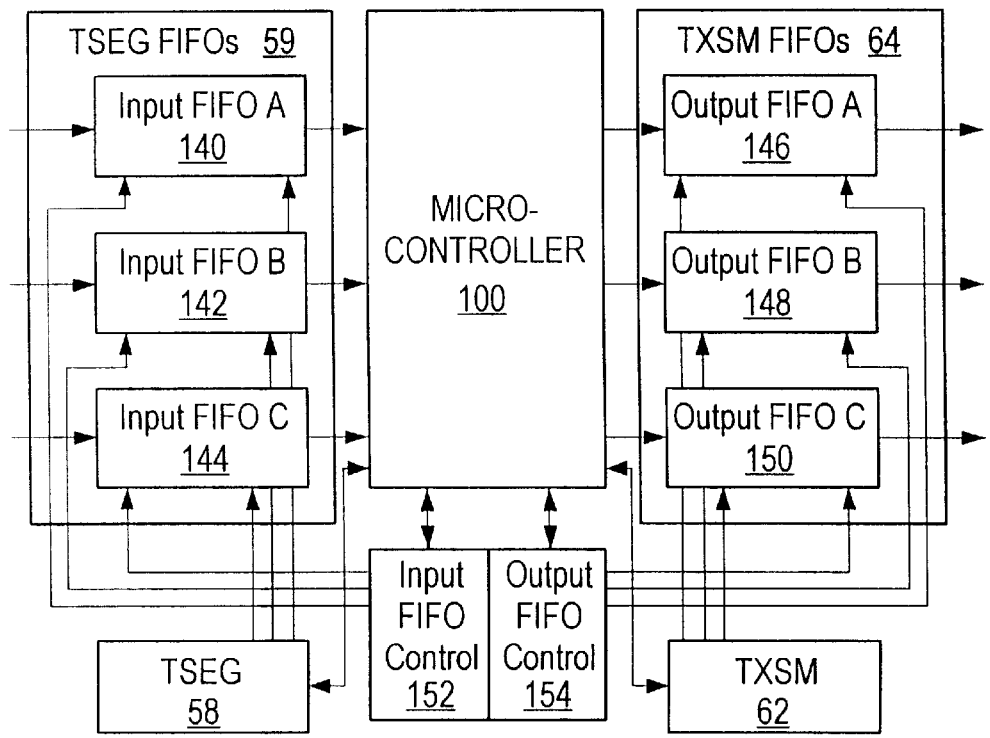

FIG. 4

THV0 Hardware Register

| No of Bit(s) | Field Description |
|---|---|
| 2 | Transmit Vector Length |
| 5 | Physical Receive Port |
| 14 | Transmit Frame Buffer Number |
| 5 | Layer 2 transmit encapsulation |
| 5 | Layer 2 receive encapsulation |

FIG. 5a

THV1 Hardware Register

| No of Bit(s) | Field Description |
|---|---|
| 13 | Transmit Buffer Length |
| 1 | Transmit Route Flag |
| 4 | Transmit Protocol ID |
| 1 | Transmit VLAN Tag in Frame |
| 3 | RFP Calculated CoS Tag |
| 5 | Transmit Virtual Port |
| 5 | High Order Bits of Xmit Physical Port Mask |

FIG. 5b

TSEG Header Format 1

| Longword | Frame Data |
|---|---|
| 0 | THV0(31-0) |
| 1 | THV1(31-0) |
| 2 | DA(47-16) |
| 3 | DA(15-0) & SA(47-32) |
| 4 | SA(31-0) |
| >4 | Rest of header |

TSEG Header Format 2

| Longword | Frame Data |
|---|---|
| 0 | THV0(31-0) |
| 1 | THV1(31-0) |
| 2 | VC(15-0) & X(39-24) |
| 3 | FD(15-0) & FL(15-0) |
| 4 | X(23-0) & FC(7-0) |
| 5 | DA(47-16) |
| 6 | DA(15-0) & SA(47-32) |
| 7 | SA(31-0) |
| >7 | Rest of header |

TSEG Header Format 3

| Longword | Frame Data |
|---|---|
| 0 | THV0(31-0) |
| 1 | THV1(31-0) |
| 2 | MX |
| 3 | FD(47-16) |
| 4 | MX |
| 5 | MX |
| 6 | MX |
| 7 | MX |
| 8 | VC(15-0) & X(39-24) |
| 9 | FD(15-0) & FL(15-0) |
| 10 | X(23-0) & FC(7-0) |
| 11 | DA(47-16) |
| 12 | DA(15-0) & SA(47-32) |
| 13 | SA(31-0) |
| >13 | Rest of header |

Table Legend

| | |
|---|---|
| THV0 | Transmit header vector 0 |
| THV1 | Transmit header vector 1 |
| DA | Dest. Addr. inserted by RHP |
| SA | Source Address |
| FD | Orig. rcvd. dest. address |
| FL | Frame length |
| FC | Frame Control (FDDI) |
| MX | Extra fields for soft xlations |
| X(23-16) | VLAN interface for routed frames |
| X(15-8) | VLAN interface for bridge frames |
| X(7-0) | Not used |
| VC | Virtual circuit handle (ATM) |

*FIG. 7*

HIGH SPEED HEADER TRANSLATION PROCESSING

BACKGROUND OF THE INVENTION

The present invention relates to computer network devices and more particularly to a method and apparatus for translating frame headers at speeds approximating frame reception rates in a bridge/router.

Personal computers came into widespread use as standalone devices. Employed in this manner, databases and other information which were resident on one computer were not readily available to other users. To address the need to share information between computers and to share peripherals, such as printers, modems, etc., among a plurality of users, local area networks (LANs) were developed. A number of different types of LANs came into widespread use; notably, 10 megabit Ethernet, 4 megabit token rings compliant with the IEEE 802.5 standard, 16 megabit token ring compliant with the 802.6 and subsequently 100 mb FDDI, 100 megabit ethernet and one gigabit Ethernet. As LAN usage became commonplace, and the installed base of disparate LAN types increased, information sharing between LANs became necessary. Bridges were developed to interconnect LANs of the same type. Bridges are essentially transparent to the network and forward all information received on an input port to all devices coupled to the same network.

Bridges and routers were developed out of a recognized need to move data between a number of separate networks, since in many cases it is not desired to forward all information received at input ports to all output ports. Given the disparate data link layer (layer 2) and network layer (layer 3) protocols, bridges and routers are oftentimes required to translate headers of frames received at one input port prior to forwarding the frame from one or more output ports. Typically, header translations have been performed in software. The translation of frame headers via the use of software routines provides considerable flexibility due to the ease of accommodating changes in existing protocols and additionally, header translations for new protocols, however software translation introduces undesirable delays within a bridge/router which can result in the need to discard frames in the event of buffer storage overflow as a consequence of the inability of the bridge/router to keep up with network traffic. Additionally, software header translation can result in increased costs of the bridge/router as a result of the need to increase buffer storage in an effort to minimize the likelihood of frame discard. Furthermore, network performance employing bridges/routers which perform header translation in software is adversely impacted since discarded frames need to be retransmitted. Finally, at the line speeds of modern networks, header translation delays interposed by software header translation routines are significant.

With the proliferation of networks worldwide, it is expected that more and more types of LANs and networking protocols will be developed. Presently organizations are experiencing the need to utilize multiple networking protocols such as the Internet protocol (IP), IPx, APPLETALK (tm), DECNET(tm) and other protocols. New versions of existing protocols as well as entirely new protocols are likely to develop in the future. Thus, it is likely that the need to perform high speed frame header translation will continue into the foreseeable future.

For the above reasons, it would be desirable to be able to perform header translations in a network device, such as a router, at or near the frame reception rate for the device so as to avoid the aforementioned problems with prior art bridges/routers.

SUMMARY OF THE INVENTION

In accordance with the present invention, a method and apparatus is disclosed for performing header translations of frames in a computer network device at rates approximating frame reception rates. More specifically a transmit header processor is disclosed which performs data link and network layer header translations for frames prior to frame forwarding, provides support for VLAN tagging, as well as other frame header translation functions.

A microsequencer is employed for controlling the movement of frames from an input FIFO to an output FIFO. The microsequencer controls appropriate header translations as the frames are moved from the input. FIFO, through the transmit header processor and to the output FIFO.

Relevant control information and data needed for the respective header translation is prepended to the frame data in the input FIFO. The control information is employed by the microsequencer to determine if a header translation is to occur, and if so, which one of a plurality of translation routines is to be performed on the respective frame. Microsequencer support acceleration hardware is provided for the microsequencer in order to reduce the header translation times. The hardware accelerators may be bypassed, so as to permit all header translations to be controlled via microcode. In this manner the transmit header processor may accommodate new protocols or bypass broken hardware via the use of such microcode.

BRIEF DESCRIPTION OF THE DRAWINGS

The invention will be more fully understood by reference to the following Detailed Description of the Invention in conjunction with the drawings of which:

FIG. 4 is a block diagram of a portion of the transmit header processor of FIG. 3 illustrating the control of three input and output FIFOs via a single transmit header processor;

FIGS. 5a–5b depict the data structure for portions of a Transmit Vector which is constructed by a Receive Frame Processor and utilized by the Transmit Header Processor in accordance with the present invention;

FIG. 7 illustrates three frame header formats that may be employed for forwarding frame header information from a Transmit Segmentation Unit to the Transmit Header Processor.

DETAILED DESCRIPTION OF THE INVENTION

Overview

Figure 1:
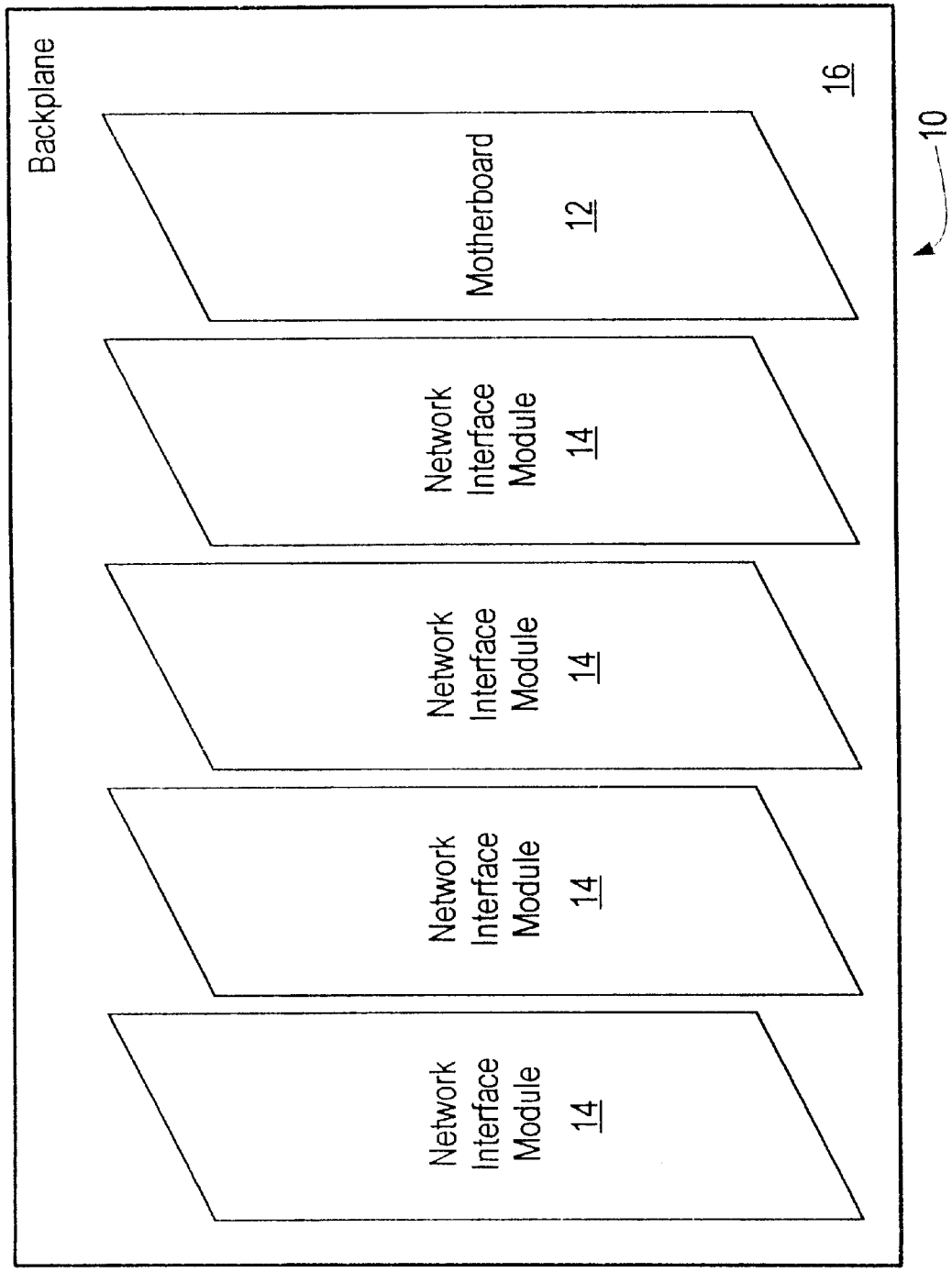
FIG. 1 is pictorial diagram of a network device in accordance with the present invention illustrating, Network Interface Modules and a Motherboard mounted to a backplane.

Referring to FIG. 1, a bridge/router network device 10 for use in a telecommunications network includes a motherboard 12 and at least one network interface module 14. Each of the network interface modules 14 interfaces to the motherboard 12 through a backplane 16.

Figure 2:
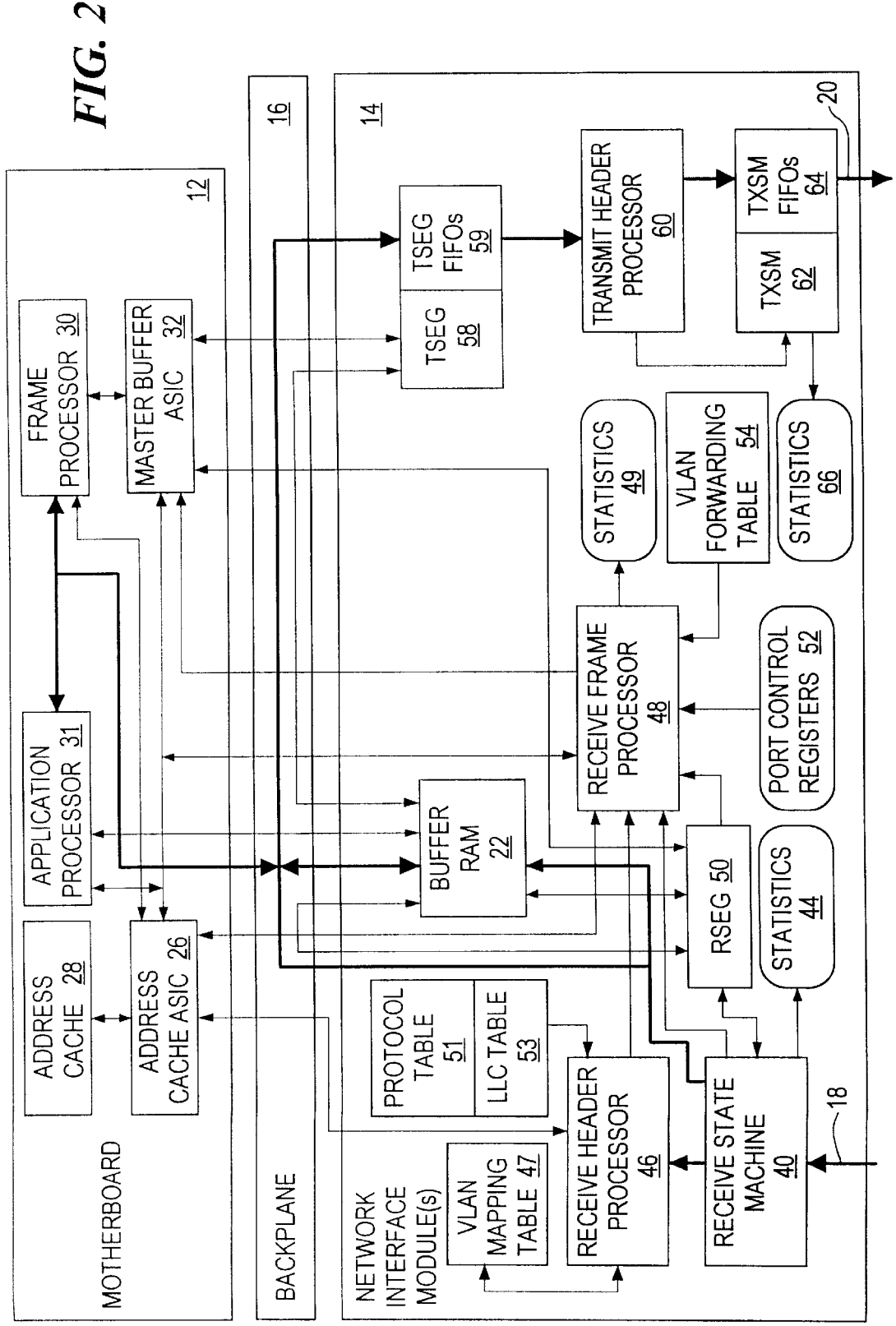
FIG. 2 is a block diagram of a network device in accordance with the present invention illustrating one Network Interface Module coupled to the Motherboard via a backplane.

Referring to FIG. 2, each network interface module 14 includes at least one input port 18 through which data units such as frames, packets and cells are received and at least one output port 20 through which data units are forwarded downstream for receipt by another network device. Typically, lower speed network interface modules 14 have a plurality of input ports and a plurality of output ports. In particular, the ports provide connections via communication links to other devices in the network. Incoming data units may be bridged, translationally bridged, routed, translationally routed or filtered.

In one embodiment of the presently disclosed network device 10, four slots are provided for network interface modules 14. Each slot may be populated with an Ethernet, FDDI or an ATM UNI interface module. In a preferred embodiment, each 10/100 megabyte Ethernet network interface module 14 includes six input/output ports, each FDDI network interface module 14 includes six input/output ports, and each gigabit Ethernet network interface module 14 includes one input/output port. An ATM network interface module 14 includes four OC3 input/output ports or one OC12 input/output port.

Elements in the motherboard 12 and interface modules 14 are responsible for data unit reception and transmission, parsing of data link and network layer headers within received frames, look-up of source and destination Media Access Control ("MAC") and network layer addresses and for making forwarding decisions regarding the received frames.

The motherboard 12 includes an address cache ASIC ("ACA") 26 with an associated cache memory 28, a Frame Processor 30, an application processor 31 and a Master Buffer ASIC ("MBA") 32.

The ACA 26 serves to perform look-ups on destination and source addresses passed to the ACA from a Receive Header Processor ("RHP") within the respective network interface modules 14. The ACA 26 is capable of looking up MAC addresses for bridging support and Network Layer destination addresses for routing support.

The MBA 32 located on the motherboard 12 serves to provide global data buffer management of frames which reside in buffers in Buffer RAM 22 disposed on respective Network Interface Modules 14.

Each network interface module 14 includes at least one receive ASIC and at least one transmit ASIC, both of which are specific to the type of data traffic supported by the respective network interface module 14 (such as Ethernet, FDDI, or ATM ).

The Receive ASIC

Each receive ASIC includes a Receive State Machine ("RSM") 40, for receiving frames at respective ports 18 of the respective network interface module 10, a Receive Header Processor ("RHP") 46 for parsing headers of received frames, Buffer RAM 22 for storing received frames, a Receive Segment Processor (RSEG) 50 for dividing the received frame into segments and moving frame segments to appropriate locations within Buffer RAM 22, and a Receive Frame Processor ("RFP") 48 for making forwarded decisions regarding received frames.

Each network interface module 14 includes at least one Receive State Machine ("RSM") 40 (one per receive ASIC). Different versions of the RSM 40 are provided for the different network interface module 14 types, i.e. Ethernet, FDDI and ATM. The RSM 40 is responsible for receiving data units from the respective input ports 18 of the network interface module 14. After receiving a data unit, the RSM 40 generates data unit status information regarding received frames which is stored in registers 44. The status information includes error information and receive byte and frame counts on a per port basis.

The RHP 46 within the receive ASIC functions to parse the incoming data units to obtain the MAC source address, the MAC destination address and network layer addresses, and to determine whether the frame is to be bridged or routed. The RHP 46 determines the VLAN that the frame was received on, if any. If the received data unit is a candidate for routing the RHP 46 determines the protocol being used for the received data unit. Such information is forwarded to the ACA control logic 26 to generate an index into the ACA cache 28. The ACA cache 28 operates under the control of ACA control logic 26 to obtain forwarding information relative to the received data unit. Cache lookups are performed in the ACA cache 28 based upon indices generated within the ACA control logic 26. In the event of a miss on one of the cache lookups, the RHP 46 forwards a first type of vector to the Frame Processor 30 for further software processing of the data unit. In the event of hits on the relevant addresses, a second type of vector is forwarded to the Master Buffer ASIC and forwarding through the router/bridge proceeds at high speed via dedicated hardware logic.

The RHP 46 is implemented primarily as a hardware microsequencer which is loaded with microcode by the frame processor 30. More specifically, the RHP 46 examines the layer 2 and layer 3 portions of the header of the received data unit to determine whether the data unit is to be bridged or routed. A protocol type table and LLC table are then employed to determine datagram type. For example, the header of the incoming ethernet data unit could be in any of a number of defined formats, for example DA/SA/Type, DA/SA/Length/LLC/OUI/Type, DA/SA/Length/LLC. The Receive Header Processor examines a field in the header following the MAC source address to determine if that field contains a length or a type. A value in the designated field of less than 1500 decimal in that location indicates a length field and value of greater than or equal to 1500 in that location indicates a type field. Based upon the results from the parsing of the layer 2 header a decision is made as to whether to employ a Type Table or an LLC table to identify a Protocol Identifier. The Protocol Identifier obtained from either the Type Table or the LLC table is employed as an index used to select a microcode processing routine for execution by the RHP and is also passed to the ACA control logic 26. Other header formats are applicable to other layer 2 protocols. Different versions of RHPs 46 are provided for different network interface types, i.e. Ethernet, FDDI and ATM.

The RFP 48 is responsible for making forwarding decisions based on information supplied by the RHP 46, the ACA 26, Port Control Registers 52, the RSM 40, the Receive Segmentation Unit ("RSEG") 50 and configuration information contained in configuration tables. A VLAN forwarding table 54 is employed by the RFP 48 to verify if the data unit is allowed to be forwarded through the designated transmit port. More specifically, RFP 48 processing results in the generation of Transmit Vectors for data units being forwarded via a high speed frame processing path and Receive Vectors for data units being passed to the FP 30 for further processing in software. In this manner two separate frame processing paths are defined; namely, a high speed hardware forwarding path and a lower speed software forwarding path. The Transmit and Receive Vectors specify the port(s) on which the frame is to be forwarded, outbound data link encapsulation type and other information needed for subsequent processing within the device 10. The RFP 48 is implemented primarily in hardware and is only partially programmable for error, monitoring and other special exception cases.

The RSEG 50 comprises a DMA controller which controls storage of received frame data within appropriate Buffer RAM 22 locations.

The Transmit ASIC

The transmit ASIC includes a Transmit Segmentation Unit (TSEG) 58, a plurality of Transmit Segment Unit (TSEG) FIFOs 59, a Transmit Header Processor (THP) 60, a Transmit State Machine ("TXSM") 62 and Transmit State Machine FIFOs 64. The TSEG 58 comprises a DMA controller which serves to move frame data segments from locations within the Buffer RAM 22 into an input FIFO designated as the TSEG FIFO 59. The TSEG FIFO 59 comprises an input to the THP 60.

The THP 60 performs necessary frame header translations and, upon completion of such translations, moves the translated header to an output FIFO designated as the Transmit State Machine (TXSM) FIFO 64. Frames are forwarded from the TXSM FIFO 64 over the respective output port 20 of the network interface module 14 for receipt by a downstream network device.

The TXSM 62 receives frames from the THP 60 and is responsible for transmitting data units from the device 10 out of the respective output port 20. Following transmission, the TXSM 62 generates data unit transmit status information for storage in statistics registers 66. Such status information includes error information and transmit frame and byte count information on a per port basis. Different versions of the TXSM are provided for different network interface module 14 types, i.e. Ethernet, FDDI and ATM.

The RHP is described with greater particularity in U.S. application Ser. No. 08/927,913 entitled MULTIPLE PROTOCOL SUPPORT which application is incorporated herein by reference and co-filed with the present application. The ACA is described with greater particularity in U.S. application Ser. No. 08/927,336 entitled A HIGH SPEED CACHE MANAGEMENT UNIT FOR USE IN A BRIDGE/ROUTER, which application is incorporated herein by reference and cofiled with the present application. The RFP is described with greater particularity in U.S. application Ser. No. 08/927,915 entitled USE OF CODE VECTORS FOR FRAME FORWARDING IN A BRIDGE/ROUTER which application is incorporated herein by reference and co-filed with the present application. All of such applications are owned by the owner of the present application.

Description of the THP Hardware

Figure 3:
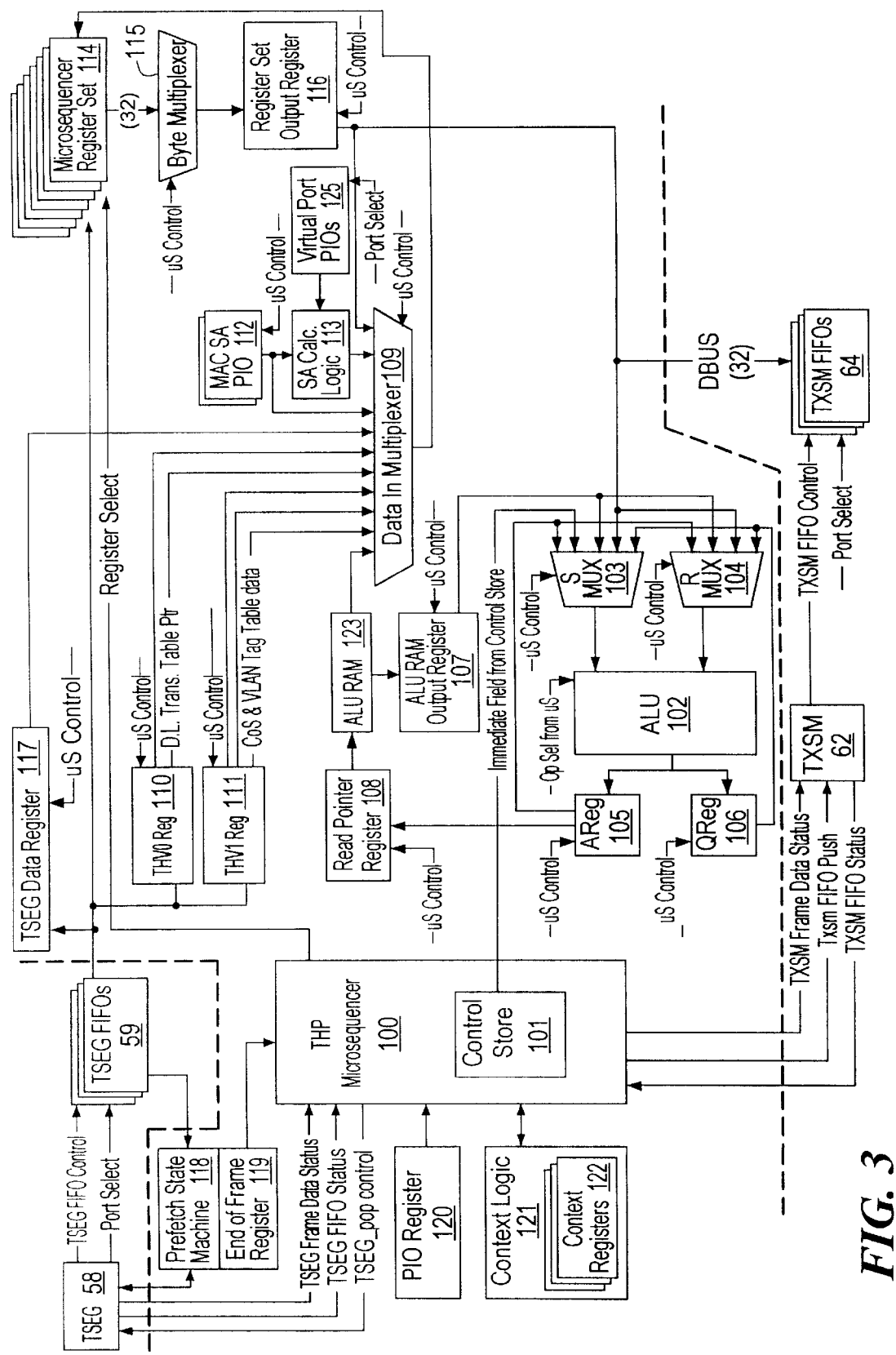
FIG. 3 is a block diagram of a transmit header processor for use in a bridge/router for performing layer 2 and layer 3 header translations at or near wire speeds.

Referring to FIG. 3, the THP 60 is responsible for performing data link header translations and network layer header translations at hardware speeds for each forwarded frame presented to the THP. The THP includes a microsequencer 100 which executes microcode stored within a control store 101. An arithmetic logic unit ("ALU") 102 is provided which is operative to perform operation on input data forwarded from a first multiplexer 103, designated as the S MUX, and a second multiplexer 104, designated as the R MUX. The ALU 102 performs operations on the respective inputs as indicated by operand selection control signals provided by the microsequencer 100. The output of the ALU 102 is coupled to a first register 105, designated as the AREG register, and a second register 106, designated as the QREG register.

The SMUX 103 receives as inputs, outputs from (1) the control store 101, (2) the AREG 105, (3) an ALU RAM Output Register 107, (4) a Register Set Output Register 116 and (5) the QREG register 106. The RMUX 104 receives as inputs, outputs from (1) the ALU RAM Output Register 107, (2) the AREG register 105, (3) the QREG register 106 and (4) the Register Set Output Register 116. The inputs of the SMUX 103 and the RMUX 104, respectively, are selectable under the control of the microsequencer 100.

The output of the AREG register 105 is also coupled to an input of a Read Pointer Register 108. The output of the Read Pointer Register 108 is coupled to an ALU RAM 123. The Read Pointer Register 108 is employed to address the ALU RAM 123. The output of the ALU RAM 123 is coupled to the ALU RAM Output Register 107 as shown.

The THP 60 further includes a Data In Multiplexer 109 which receives as inputs, outputs from (1) the ALU RAM 123, (2) a THV0 Register 110, (3) a THV1 Register 111, (4) a TSEG Data Register 117, (5) MAC SA Programmable I/O Registers (MAC SA PIOS) 112, (6) Source Address Calculation Logic 113 and (7) the Register Set Output Register 116.

The output of the TSEG FIFOs 59 is coupled to the input of the THV0 and THV1 registers, 110 and 111, respectively, and is also coupled to the TSEG Data Register 117 and the microsequencer register set 114 which comprise a plurality of registers which are independently selectable and loadable under microsequencer control. The output of the microsequencer register set 114 is coupled to a byte multiplexer 115, which permits swapping of bytes applied to the input of the byte multiplexer 115 from a selected register of the register set 114. Additionally, the byte multiplexer 115 permits the masking of selected bytes applied to the byte multiplexer 115 inputs. The output of the byte multiplexer is coupled to the Register Set Output Register 116 which is loadable under microsequencer control. The Output of the Register Set Output Register 116, in addition to being coupled to the SMUX 103 and RMUX 104, is also coupled to the TXSM FIFOs 64.

The THP 60 also includes context logic 121 including context registers 122 and a Programmable IO register 120.

The various THP hardware registers store information that is used by the microsequencer 100 during the header translation process.

Transmit Hardware Vector Registers

The first 2 longwords of every frame in the TSEG FIFO are the transmit header vector words. These 2 longwords are initially loaded in the THV0 and THV1 Registers, 110 and 111, respectively at the beginning of the translation of a frame header. The information in these registers is necessary for translation of the respective header. The contents of the registers are specified in FIGS. 5a and 5b.

Context Registers

Context information is maintained within the registers 122 of the context logic 121. The THP 60 may not be able to service an entire frame on a port before starting to service a frame on another port. The THP 60, therefore, stores the information context for one port when it goes on to service the next port. When it comes back to prior port, it can utilize the information within the respective context registers to determine where it left off. The context for a given port is cleared when the end of frame is reached. The THP 60 does not keep track of TSEG and TXSM FIFO 59 and 64 pointers, this is done by the TSEG 58 and TXSM 62 hardware respectively. The context information maintained for each port is described below.

1. Header context: If the header context is 1, the frame header is at the head of the TSEG FIFO 59. If it is 0, the header has been processed and frame payload needs to be moved. This bit is set to 1 when the context is cleared. Context is cleared when the end of frame has been reached.

2. Byte offset context: The byte offset indicates how frame payload is to be moved from the TSEG FIFO 59 to the TXSM FIFO 64. The byte offset for a frame will remain constant for the entire frame transmission.
3. Translation context: When this bit is 1, the THP 60 is translating (modifying) some part of the frame header. The bit will be set to 1 by the THP 60 microcode during header processing. This context bit is sent to the TXSM 62 so that the CRC can be regenerated for the frame. This bit is cleared when the end of frame has been reached.
4. Route context: This bit, when set, indicates that the frame is a routed frame. This bit comes from the transmit header vector and is used as a condition code into the microsequencer 100. It is also used by the TXSM 62 for generating statistics. It remains valid for the duration of the frame and is reloaded when the Transmit Header Vector for the next frame is processed.
5. Protocol ID: This 4 bit context field indicates the routing protocol of the frame. It comes from the transmit header vector and is used by the microcode to determine how to translate the layer 3 header. It is also used by the TXSM 62 for generating statistics. It remains valid for the duration of the frame and is reloaded when the Transmit Header Vector for the next frame is processed.
6. Multicast context: This bit indicates, when set, that the frame is a multicast frame. It is decoded from the transmit encapsulation field in the transmit header vector and is used as a condition code into the microsequencer. It is also used by the TXSM for generating statistics. It remains valid for the duration of the frame and is reloaded when the Transmit Header Vector for the next frame is processed.
7. Broadcast context: This bit, when set, indicates that the frame is a broadcast frame. It is decoded from the transmit encapsulation field in the Transmit Header Vector and is read from the condition log 120 as a condition code by sequencer 102. It is also used by the TXSM 62 for generating statistics. It remains valid for the duration of the frame and is reloaded when the Transmit Header Vector for the next frame is processed.

PIO Register

The Limit PIO Register 120 is used to store an indication of the number of longwords that must be in the TSEG FIFO before the THP will begin moving those longwords. In a case where the frame is shorter than the number of longwords specified in the PIO register 120, the THP will move data to the register set 114 when TSEG indicates that the end of frame is in the TSEG FIFO. The THP will also commence movement of longwords to the register set 114 when the number of longwords remaining to be forwarded for a long frame is less than the number specified within the PIO Register 120.

MAC SA PIO Registers

Two MAC PIO Registers 112 are used to store the base source address of the network device 10; namely the MACSA_LO Register and the MACSA_HI Register. The MACSA_LO Register contains bits 0–31 of the base MAC source address for the network device 10, which is typically a bridge/router. The MACSA_HI Register contains bits 47–32 of the base MAC source address for the respective network device 10.

These registers are employed to calculate the source address for routed frames or when generating the source address for a transmitter off (XOFF) frame. The new source address for the routed frame or the XOFF frame is obtained by adding the target virtual port contained within a virtual port PIO 125 to the contents of the MAC SA PIO Register 112. The above described Source Address calculation is accomplished in Calculation Logic 113 to alleviate the need for the microsequencer to perform this tasks in microcode.

TSEG DATA Register

The TSEG Data Register 117, stores data from the TSEG FIFO. This Register may be utilized to store data which comes early in the frame but is not needed immediately for frame header processing. One example of such data is the frame length field since it is stored in the TSEG FIFO before the Destination Address and the Source Address, but will always be inserted into the frame after the Destination Address and the Source Address. Since the TSEG FIFO is a forward only FIFO, the frame length must be read prior to its use.

End of Frame Register

A dedicated register herein referred to as the end of frame register 119 is provided in the THP which is used to accelerate end of frame checking when prefetching longwords. The end of frame register 118 comprises an eight bit register. One of the eight bits indicates the presence of an end of frame condition in any of the 7 longwords. A single bit is set in one of the other seven bits in the end of frame register 119 to indicate which longword contains the end of frame condition. A hardware state machine is provided which reads a pop control line from the microsequencer 100 and the end of frame status line from the TSEG 58 in order to set the appropriate bit of the seven bits within the end of frame register 119. Only one of the seven bits within the end of frame register may be set at any given time. When the eighth bit is set (short frame bit), one of the seven bits contains an end of frame condition. Upon detecting that the short frame bit is set, the microsequencer executes a specific data forwarding routine after all layer 2 and layer 3 header translations are complete. Such routine utilizes the seven bits in the end of frame register 119 as condition codes in the forwarding of data from the seven longwords registers 114 within the THP to the TXSM. The microsequencer terminates forwarding of the longwords from the longword registers 114 upon detection of the corresponding set bit within the end of frame register 119. The provision of the above described hardware assist logic avoids the need for the microsequencer to utilize multiple cycles to test each longword for an end of frame condition, therby alleviating the microsequencer of such overhead processing.

Layer 2 Translation Jump Table

When the THP processes a frame header, the first thing it must do is determine what type of data link (layer 2) translation needs to be done on the frame. The translation to be done depends on the receive encapsulation and the transmit encapsulation. For example, if the frame was received with the Ethernet Version 2 encapsulation and it will be transmitted on an FDDI link with an LLC encapsulation, the THP must do the following:

1. Append the frame control byte to the start of the frame.
2. Insert a 3-byte LLC field after the source address.
3. Remove the TYPE field from the Ethernet Version 2 header.

The THP microcode uses a table of translation routines stored in the ALU RAM 123 to identify and select the appropriate translation routine. For unicast frames and bridge multicast frames, the table is indexed by the concatenation of the transmit and receive encapsulation codes stored in the THV0 register 110. The THP hardware concatenates the encapsulation fields and moves the concatenated fields, under microcode control, into the ALU RAM Read Pointer Register 108 so that the table can be accessed. The table output is the offset into a microcode jump table called the layer 2 translation jump table. The offset is added to the jump table base address and the microcode jumps to the resulting address. The micro instruction at the calculated jump table address will jump into the layer 2 translation routine.

For IP Version 4 multicast frames, the transmit encapsulation in the THV0 register will not indicate the layer 2 encapsulation of the outgoing frame. Instead it will indicate that the frame is an IPv4 multicast frame. The THP has a table that stores the transmit encapsulation codes for Ipv4 multicast frames on a virtual port basis. When the hardware detects the Ipv4 multicast encoding, it concatenates the transmit encapsulation from the table with the receive encapsulation from the transmit header vector. This is then used to select the appropriate translation routine.

Layer 3 Translations

Layer 3 translations are performed on routed frames only. There is a route flag in the transmit header vector that indicates whether or not the frame is a routed frame. The layer 3 header modification depends on the route protocol. The protocol ID is also stored in the transmit header vector.

Each of the layer 2 translation routines checks the route flag, which comprises a condition code to the microsequencer 100. If the route flag is set, the layer 2 routine will branch into the layer 3 jump table. The layer 3 jump table address is calculated by adding the protocol ID to a layer 3 jump table base address stored in microcode.

Example of Operation of the THP Hardware and Microcode

Operation of the THP hardware and Microcode is described with reference to the block diagrams illustrated in FIGS. 3 and 4. At the commencement of header translation, the THV0 register 110 is loaded with the first word of the transmit vector from the TSEG FIFO 59 under the control of the microsequencer 100. The THV0 Register 110 then contains the receive encapsulation and the transmit encapsulation for the respective frame. The Data In Multiplexer 109 is then enabled under control of the microsequencer 100 to select the receive encapsulation on bits 0–2 of the Data In Multiplexer Output and to select the Transmit Encapsulation on bits 3–7 of the Data in Multiplexer 109 output. The 32 bit word comprising the output of the Data In Multiplexer 109 is then loaded into one of the registers of the Microsequencer Register Set 114 specified by the microsequencer 100 (Register 6 in the present example. The specified register (Register 6) within the Register Set 114 is next applied to the Byte Multiplexer 115. The microsequencer 100 controls the Byte Multiplexer 115 so as to mask off and set to zero (0) the upper 2 bytes of the input word. Accordingly, the receive encapsulation value and the transmit encapsulation value appear on the output of the Byte Multiplexer 115 in the least significant byte with the three more significant bytes set to zero. The resultant data word is loaded into the Register Set Output Register 116 under the control of the microsequencer 100. The data word from the Register 116 is coupled to the ALU 102 through the RMUX 104. The ALU 102 Operand is selected by the microsequencer 100 to pass the 32 bit data word through the ALU 102 unmodified. The 32 bit data word, comprising the concatenated receive and transmit encapsulation, is loaded into the register AReg 105 under microsequencer 100 control. The output of the register AReg 105 is next loaded into the Read Pointer Register 108 to index into the ALU RAM 123. Based upon the input address to the ALU RAM, the ALU RAM presents an output which comprises an offset value into a microcode jump table. The output of the ALU RAM 123 is coupled through the Data In Multiplexer 109 under microsequencer 100 control and the offset value is stored in one of the registers of the Register Set 114. Bits 1 and 0 of the receive encapsulation value are next employed as condition codes to select one of the four bytes received from the ALU RAM 123 as an offset value into the microcode jump table. More specifically, Bit 1 of the receive encapsulation is first tested by the microsequencer 100. If the bit is set, such indicates that the byte to be used as an index into the microcode jump table is one of the least significant bytes. If the bit is not set, such indicates that the byte to be used as an index into the microcode jump table is one of the most significant bytes. Bit 0 is next tested as a condition code by the microsequencer 100 to determine whether the upper or lower byte of the two most significant bytes or the two least significant bytes, respectively, is to be employed as the offset. The Byte Multiplexer 115 is next selected by the microsequencer 100 to pass the selected byte as the least significant byte of the 32 bit output word from the Multiplexer 115. The offset value thus obtained is passed to the ALU 102 via the RMUX 104. A base address is passed to the ALU 103 via the SMUX 103 from the Control Store 101 via the Immediate Field signal path. Consequently, the offset appears at one input of the ALU 102 and the base address appears at the other input of the ALU 102. The ALU 102 operand is set to add the two input values by the microsequencer 100 and the sum of the base address and the offset value thus obtained is stored in the AReg Register 105 under microsequencer 100 control. The microsequencer 100 then executes an operation by which it jumps to the address specified by the AReg Register 105 and commences execution of the translation routine at the respective address within the control store 101. The above example is illustrative of the manner for selecting and initiating a translation routine based upon layer 2 receive and transmit encapsulation values.

As indicated above and as depicted in FIG. 3, the TSEG 58 comprises a DMA controller which functions to control the movement of frames from the Buffer RAM 22 to the TSEG FIFOs 59 for delivery to the THP 60. The TSEG 58 is employed to select one of a plurality of FIFOs within the TSEG FIFOs 59 and to specify the location of the next address within the selected FIFO to be moved to the microsequencer register set 114, the THV0 register 110 or the THV1 register 111 as specified by the microsequencer 100.

In a preferred embodiment depicted in FIG. 4, the TSEG FIFOs 59 and the TXSM FIFOs 64 are each illustrated as comprising three (3) FIFOs, each FIFO pair being employed for one transmit port. More specifically, the TSEG FIFO 59 includes TSEG FIFO A 140, TSEG FIFO B 142, and TSEG FIFO C 144 and the TXSM FIFO 64 includes TXSM FIFO A 146, TXSM FIFO B 148 and TXSM FIFO C 150. Although in the present implementation, the THP supports three TSEG/TXSM FIFO pairs for three corresponding output ports, the THP 60 may support any number of TSEG/TXSM FIFO pairs desired, subject to speed constraints of the THP and constraints involving process technologies employed to fabricate the applicable ASIC. In a preferred embodiment two receive ASICs and two transmit ASICs are employed on one Network Interface Module 14 to provide six (6) input and output ports 18 and 20 respectively.

The decision as to the specific translation to be undertaken in the THP 60 is based on inputs from the RHP, RFP, ACA and certain configuration information passed to the THP as subsequently described.

For transparently bridged frames, only the data link headers must be changed and the output encapsulation type is a function of inbound encapsulation type, output network media type and frame protocol type. For routed frames, the network layer headers must be changed and the output frame encapsulation type is explicitly defined per routed protocol, per interface; i.e. it is independent of the inbound frame encapsulation type.

The Data Input Multiplexer 109 receives as inputs signals from the THV0 Register 110, the layer 2 receive encapsulation and the layer 2 transmit encapsulation identifiers (See FIG. 5a). In response to these inputs, a value is selected by the which comprises the starting location of a translation routine based upon the layer 2 receive encapsulation and layer 2 transmit encapsulation inputs. In this manner, software delays associated with selection of a translation routine are avoided.

The microsequencer 100 executes translation routines contained within a control store 101 to perform desired layer 2 and layer 3 header translations. Acceleration hardware (See FIG. 3) is employed in conjunction with the microsequencer 100 to reduce the time for each translation. The acceleration logic, however, may be bypassed so as to have the entire frame translation routine executed by the microsequencer out of the associated control store 101. By providing the ability to execute and accomplish the entire header translation out of the control store 101, the THP 60 may readily be altered to accommodate new protocols and header translation requirements. Additionally, the ability to bypass the acceleration logic permits the THP 60 to continue to function in the event a failure in the acceleration logic is detected.

The respective header translation for any given frame is based on the information in the Transmit Vector generated by the RFP 48. The THP implements data link header translations for ethernet, FDDI and ATM network media and additionally, makes specific changes to the Network Layer header for routed frames such as IP header and hop count modifications, and any other modifications that may be required in the translation of a routed frame. Acceleration logic is also provided in the THP hardware to facilitate the change of the received SA address to the SA address to be transmitted. More specifically, the new SA in a routed frame must be the MAC address of the Router which sent the frame. The SA of the router is determined on a per port basis. Such is determined by adding to a base source address a virtual port address for the respective port using hardware logic to accomplish the addition. The THP 60 includes routines for translation among a plurality of different MAC and network Layer protocols. The THP is implemented primarily in microcode which may differ depending on whether the network interface module is adapted for use with ethernet, FDDI or ATM protocols.

More specifically, the THP THV0 and THV1 registers receive frame translation control data and information from one of the TSEG FIFOs. Three TSEG FIFOs 120 are provided per THP (one per transmit port). The Transmit Segment Unit ("TSEG") 58 is the hardware that delivers transmit vectors and frame data to the TSEG FIFOS 59 from the Buffer RAM 22. The THP 60 receives frame data, frame data status and FIFO status from the Transmit Segment Unit (TSEG) 58 and the THP 60 drives the TSEG FIFO 59 read control. Frame data is received by the THP 60 from the TSEG FIFOS 59 one longword (32 bits) at a time; namely, the longword at the head of the TSEG FIFO 59. When the microsequencer 100 is ready to receive another longword from the TSEG FIFO 59, it drives the read control signal tseg_pop to a non zero value. The TSEG FIFO 59 read pointer then moves forward by the value on the tseg_pop lines. More specifically, a value of 1 will move the TSEG FIFO 59 read pointer to the next word, a value of 2 will move the pointer 2 words, etc. The TSEG FIFO 59 can only move in the forward direction. Hardware acceleration is provided to facilitate the movement of selected information from the TSEG FIFO to the THP while accounting for the fact that the Header format for the respective frame in the TSEG FIFO may be in any one of three specified formats. More specifically, signals from the microsequencer 100 indicate the next word that the microsequencer 100 needs for processing. Hardware, decodes these signals from the microsequencer to generate an appropriate pop signal to load the appropriate longword from the TSEG FIFO. Via hardware decoding of such microprocessor generated signals, microcode steps are avoided and performance is improved.

The TSEG FIFO 59 status indicates how many words of frame data are in the TSEG FIFO 59 and if there is an end of frame in the FIFO 59.

All checking of the number of valid longwords in the TSEG FIFO 59 and the amount of space in the TXSM FIFO 64 for both header processing and payload delivery are done via hardware comparators to avoid dedication of microcode cycles for such activities. In this manner, the performance of the THP is improved.

The TSEG 58 frame data status indicates when the current longword of frame data is the last longword in the frame and how many bytes in the last longword are valid.

The THP 60 sends frame data to the TXSM FIFOs via the microsequencer register set 114 and also provides the TXSM with frame data status and push control signals. The microsequencer receives FIFO write status signals from the TXSM 62. The TXSM FIFO 64 stores translated frame headers and frame payload to be transmitted out the respective output port 20. Frame data directed to the TXSM FIFO 64 is usually delivered in full longword quantities, however, partial pushes of frame data from the THP 60 to the TXSM FIFO 64 is also permitted. All data delivered to the TXSM FIFO 64 are left justified and there are no gaps between valid bytes. The number of valid bytes in a longword is indicated by the last byte pointer control from the THP 60. Partial pushes are necessary when pushing the last data bytes of a frame and in some header translation routines.

The microsequencer 100 generates a signal which indicates that a longword is the last longword of the frame by asserting an end of frame signal and by providing a signal which indicates how many bytes in the last longword are valid. A longword from the TSEG FIFO 59 may be split by the THP 60 such that the whole longword quantity from the TSEG FIFO 59 does not go into the same longword slot in the TXSM FIFO 64. When the end of frame is encountered in the TSEG FIFO 59, the last bytes from the TSEG FIFO may fit into a single TXSM FIFO 64 slot or they may not. If it does not fit into a single TXSM FIFO 64 slot, the THP 60 must do an extra push to the TXSM FIFO 64.

The TXSM 62 sends FIFO status to the THP 60 to indicate how may longwords of space is available in the TXSM FIFO 64. The THP 60 will not start moving frame data from the TSEG FIFO 59 to the TXSM FIFO 64 unless the TXSM FIFO 64 has enough room for the data being moved.

Although FIG. 3 illustrates the use of a single TSEG FIFO 59 and TXSM FIFO 64 for purposes of simplicity, in a preferred embodiment of the invention one THP supports three TSEG FIFOs 59 and three TXSM FIFOs 64 for three respective transmit ports as depicted in FIG. 4. The TSEG FIFOs 59 are polled in a round robin fashion under the control of the THP 60.

Polling of TSEG FIFOs is performed in hardware via the use of a counter to avoid dedication of microsequencer cycles to this activity. In this manner, the performance of the THP is improved.

The THP may or may not process an entire frame at one time. Each THP manages a plurality of input (TSEG) FIFOs 59 and a corresponding plurality of output (TXSM) FIFOs 64; each FIFO pair being allocated to one transmit port within the bridge/router. A transfer limit is defined which specifies the number of longwords that will be processed before moving on to the next port in a round robin fashion. Frames that have less longwords than the transfer limit will thus be processed at one time. The THP 60 may therefore process a portion of a first frame, save context information, process frames on other ports and resume processing for the first frame. The THP always processes a header in a single context.

The transfer limit is set by loading a register under software control at initialization. Four different limits may be provided. A hardware counter is provided which counts up to the value in the transfer limit register. A hardware comparator signals when the transfer limit is reached and context port switching is then invoked. In this manner the microsequencer 100 is alleviated of the task of counting longwords transferred from the TSEG FIFO and performance of the THP is improved.

Saving of context per port and the provision of new context information is accelerated via hardware external to the microsequencer 100. More specifically, new context is multiplexed onto microsequencer 100 condition code inputs so that they are immediately available to the microsequencer. The context information which is provided to the microsequencer is saved on a per port basis within the context registers 122 of context logic 121 so that such information will be available to the microprocessor when again needed for the respective port.

Referring to FIG. 2, the THP 60 operates as follows. The RHP 46 microcode, which is specific to each media type, is responsible for decoding data link headers and determining frame inbound data link encapsulation type and frame protocol type; i.e. bridging or routing type.

For unicast bridged frames the ACA 26 performs a MAC destination lookup and returns an outbound port number on which the frame is to be transmitted. For bridged frames, the outbound encapsulation frame type will be set to zero. For unicast routed frames, the ACA 26 performs a network layer destination address lookup and returns an outbound port number on which the frame is to be transmitted along with outbound encapsulation frame type. For routed frames, the outbound encapsulation frame type is defined per interface and the information is stored in the ACA route cache 28.

The RFP 48 receives input from the RHP 46 such as inbound frame encapsulation type and it receives input from the ACA 26 such as a Destination Address and outbound port number. The RFP 48, based upon the received information, constructs a Transmit Vector which has sufficient information for the THP 60 to derive the appropriate Data Link and Network Layer (for routed frames) translation routine to be executed by the microsequencer 100 within the THP 60. The information contained within the Transmit Vector is depicted in FIGS. 5*a* and 5*b* and includes inbound and outbound frame encapsulation types, a frame protocol index, a routing flag and other information therein depicted. The Transmit Vector is forwarded to the MBA 32 following construction by the RFP 48 and is enqueued on one or more per port queues within the Buffer RAM 22.

The THP 60 maintains network media specific data link translation tables which define unique translation program IDs for data link header changes. The THP 60 handles unicast and multicast bridging and routing via the execution of the unique translation programs specified by respective translation program IDs. The THP 60 always uses the inbound data link encapsulation type as an index into the appropriate data link translation table. The THP selects the appropriate data link translation table based upon the outbound data link encapsulation type.

The THP contains a number of microcoded data link translation programs. Each program defines a specific data link translation. A default translation is provided which, when selected, makes no changes to the frame. The translation program ID which is derived by the THP 60, is used to select and execute a corresponding translation program. The THP always instructs MACs to regenerate a CRC on the frame when data link or network layer header changes take place or when the original frame does not contain a CRC (such as an FP generated frame).

If the Route Flag ("RF") indicator bit is set in the Transmit Vector the THP 60 uses the Protocol ID to select a translation routine specific to the routed protocol identified by the Protocol ID.

Exemplary Method of Operation

Figure 6A:
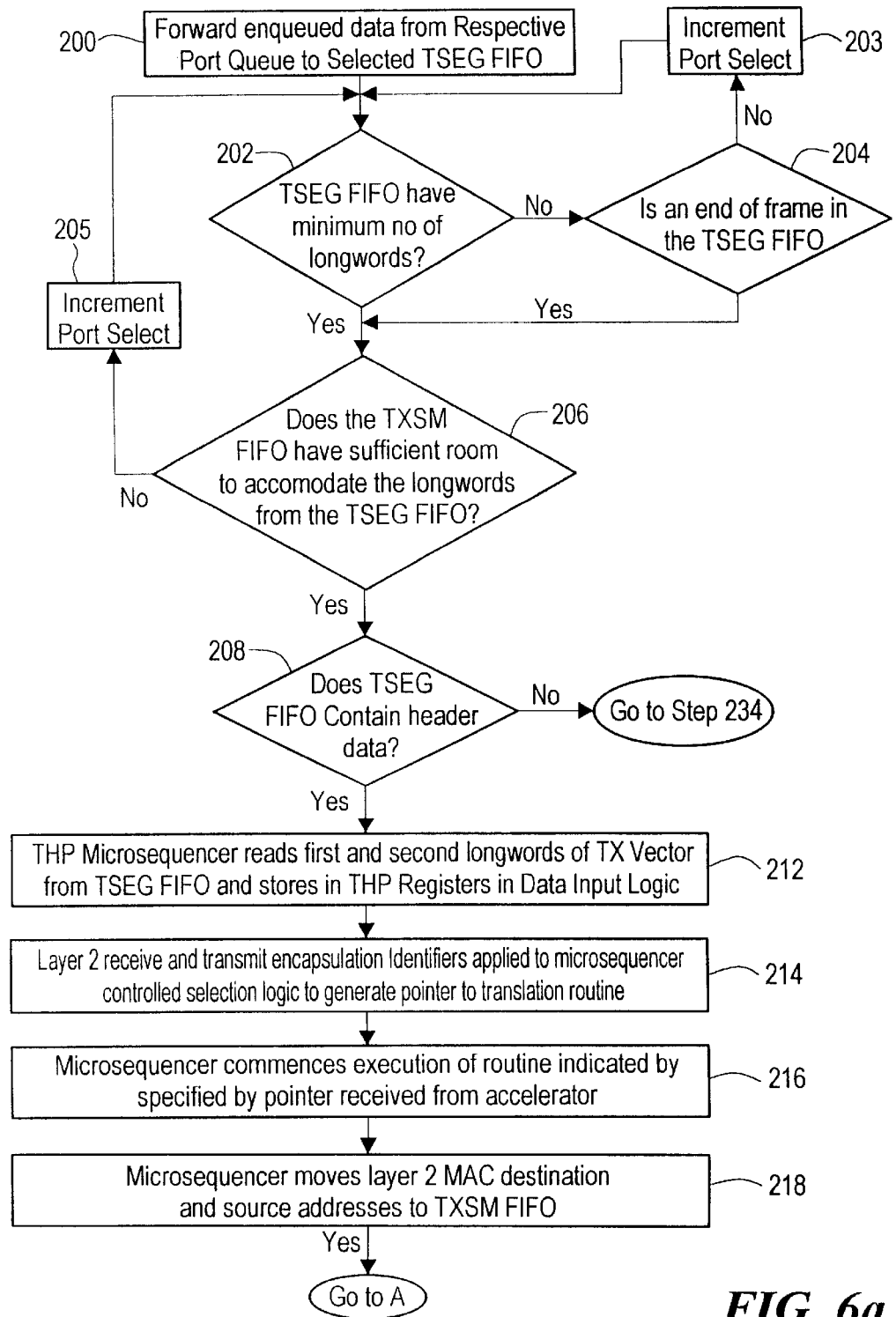
FIGS. 6a–6c are flow charts illustrating the method of operation of the presently disclosed Transmit Header Processor.
Figure 6B:
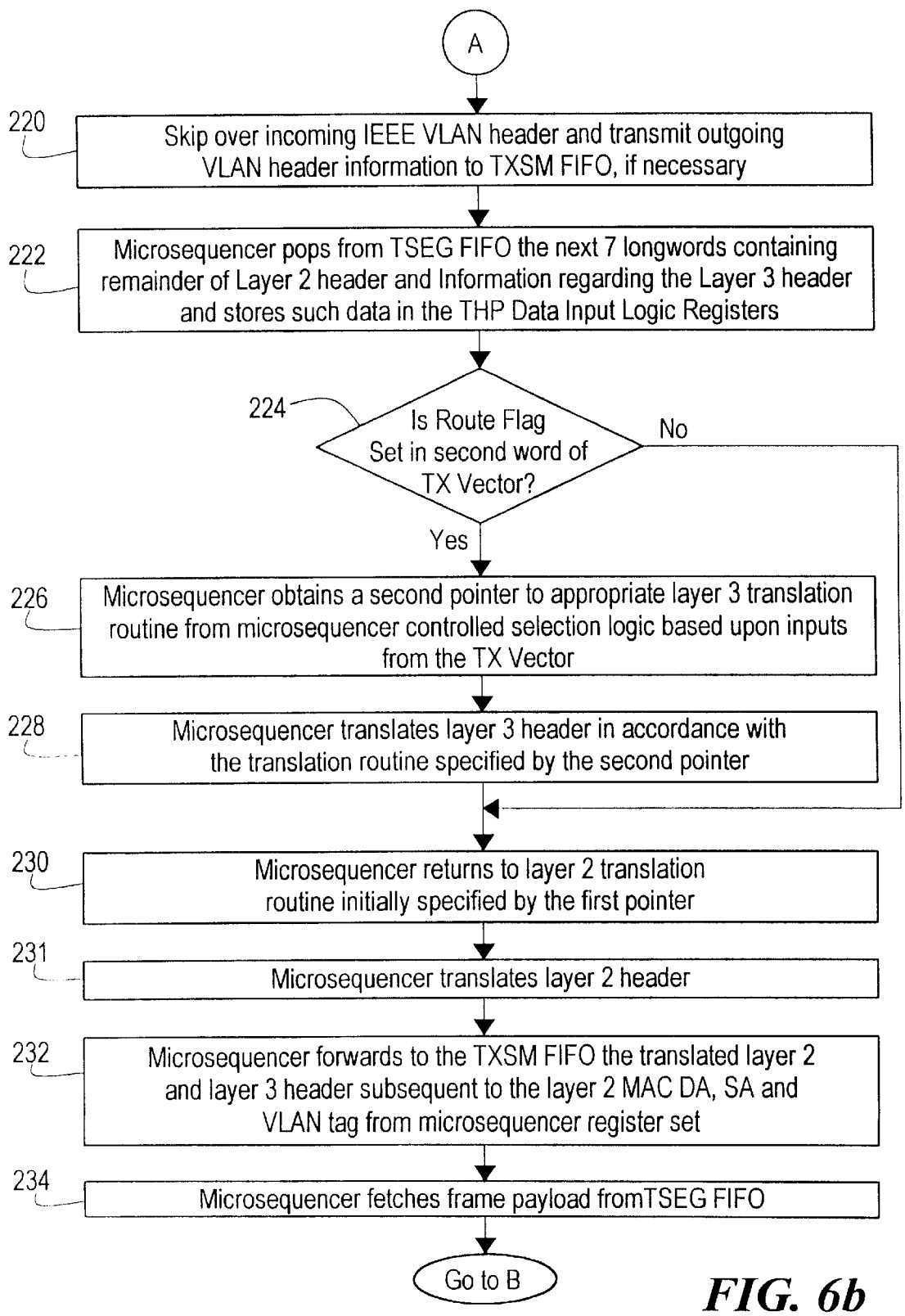
Figure 6C:
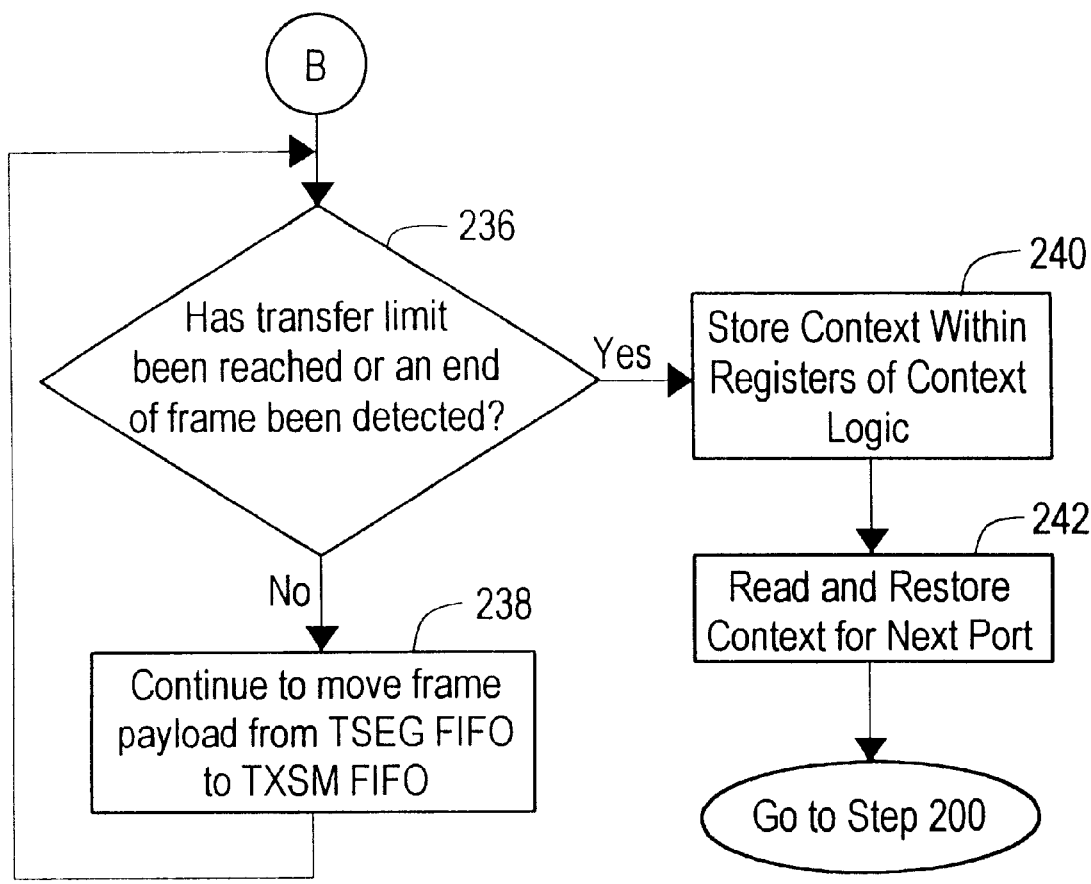

The method of operation of the hardware microsequencer 100 and associated support hardware comprising the THP engine is generally illustrated in FIGS. 6*a*–6*c*. Frames are delivered to Transmit Segmentation Unit (TSEG) FIFOs 59 from the Buffer RAM 22 based upon per port queues maintained within the MBA as depicted in step 200. The Transmit Segmentation Unit (TSEG) 58 queues transmit vectors from the Master Buffer ASIC (MBA) 32, which indicate where in the Buffer RAM 22, respective segments of transmit frames are stored. The frames are packed into the TSEG FIFO 59 so that there are no spaces between bytes. Information needed by the THP 60 to identify and execute the proper translation routine is contained within the transmit vector which is prepended to each frame presented to the THP for header translation.

The following steps are executed by the THP 60 in performing a header translation:

A determination is made by the THP 60 if a frame is available for forwarding and/or translation through the THP 60 as illustrated in steps 202, 204 and 206. A frame is available for header processing if the respective TSEG FIFO 59 has the minimum number of longwords for header processing and the TXSM FIFO 64 has enough space to accommodate the longwords from the TSEG FIFO 59 and the THP header context for the respective FIFO is enabled to permit processing. A frame is available for payload processing (1) if the respective TSEG FIFO 59 has the minimum number of longwords for payload delivery, (2) the TXSM FIFO 64 has sufficient space to accommodate the payload, and (3) the header context bit is reset. The THP 60 can also commence payload delivery from the TSEG FIFO 59 to the TXSM FIFO 64 if the THP 60 is signalled by the TSEG 58 that an end of frame is contained within the TSEG FIFO 59 and sufficient space exists within the TXSM FIFO 64 to receive the contents of the TSEG FIFO 59.

A determination is made as to whether the frame data within the TSEG FIFO 59 comprises header information or payload information as depicted in step 208. The information defining the contents of the TSEG FIFO 59 as either header or payload in type, is stored within context registers 122 within context logic 121 and communicated to the microsequencer 100 as a condition code.

If the condition code indicates to the microsequencer 100 that header information is contained within the respective TSEG FIFO 59, the microsequencer 100 proceeds with a header processing routine as described below.

In the event that the condition code indicates to the microsequencer 100 that the TSEG FIFO 59 contains frame payload data, fetching and movement of the frame payload from the TSEG FIFO through the Register Sets 114 and to the TXSM FIFO 64 proceeds as discussed subsequently with respect to steps 234 and following.

In particular, in the event that the condition code indicates that header information is contained within the TSEG FIFO 59, the microsequencer 100 reads the first longword of the transmit header vector from the TSEG FIFO 59 and stores the first longword within the THV0 Register 110 (See FIG. 5) as illustrated in step 212. The first longword includes an identification of the layer 2 receive encapsulation and the layer 2 transmit encapsulation for the designated output port. Such information is used by the THP 60 to determine what type of translation the THP 60 will need to perform and the format of the frame to be processed.

The THP 60 next reads the second longword of the transmit header vector from the TSEG FIFO 59 (See FIG. 5b) as further illustrated in step 212. The second longword of the transmit header vector includes a Transmit Protocol Identifier which specifies the routing protocol to be employed, if any.

The layer 2 transmit and receive encapsulation identifications contained within the THV0 hardware register are applied to microsequencer controlled selection logic to derive a first pointer to a layer 2 translation routine as shown in step 214. The THP uses the first pointer to read a RAM. The RAM output comprises an offset used to generated a jump address to the layer 2 translation routine in conjunction with a base address stored in the control store 101. The THP microsequencer jumps to the jump address and commences the translation sequence described below as illustrated in step 216.

The microsequencer 100 causes the layer 2 MAC destination address and MAC source address to be forwarded to the respective TXSM FIFO 64 as shown in step 218.

The microsequencer 100 next skips over incoming IEEE VLAN header information and transmits outgoing VLAN header information, if necessary, to the respective TXSM FIFO 64 as illustrated in step 220.

Hardware acceleration is provided to facilitate VLAN tag translation, when necessary. More specifically, a RAM is provided which stores the new VLAN tag an control information which indicates whether the VLAN tag needs to be inserted, and, if it is to be inserted, the insertion location within the transmit header. An output from the microsequencer 100 indicates that the RAM Address is valid. The RAM address is obtained from information stored within the TSEG FIFO (5th word of format 2 or the 10th word of format 3). When microsequencer 100 signals that the RAM address is valid, the relevant RAM address is stored in a hardware register and the VLAN tag and control information becomes available to the microsequencer 100 from the RAM output. The microsequencer 100 reads the respective condition codes and in response thereto provides an output signal which causes the VLAN tag to be loaded into one of the registers 114 of the Microsequencer Register Set.

The microsequencer 100 pops the next seven (7) longwords after the layer 2 MAC source address from the TSEG FIFO 59 and stores them in Microsequencer Register Set 114. The seven longwords comprise the remainder of the layer 2 header and enough of the layer 3 header to do any layer 3 translation that is required.

The microsequencer next tests the route flag as illustrated in decision step 224. The route flag comprises a single bit within the THV1 hardware register. If the route flag is set, indicating that the frame is a routed frame, a second pointer is provided to the microsequencer 100 via the use of microsequencer 100 controller selection and acceleration logic. The pointer is used to specify the appropriate layer 3 translation routine as shown in step 226. The layer 3 translation routine, specified by the second pointer, determines where the layer 3 header begins. The microsequencer 100 makes any required modifications to the layer 3 header stored within the Microsequencer Register Set 114 as depicted in step 228. Following completion of the layer 3 header translation routine specified by the second pointer, the microsequencer returns to the layer 2 translation routine selected by the first pointer and then performs the layer 2 translation operations embodied in the selected layer 2 translation routine as depicted in step 230.

Following the completion of layer 2 and any indicated layer 3 header translations, the translated layer 2 and layer 3 header portions subsequent to the layer 2 destination address and layer 2 source address are forwarded from the Microsequencer Register Set 114 to the respective TXSM FIFO 64 as depicted in step 232.

The microsequencer 100 next fetches the frame payload from the respective TSEG FIFO 59 until the transfer limit has been reached as illustrated in steps 234 and 236.

Upon determination that the transfer limit has been reached for the respective transfer, the context for the respective frame translation operation is stored within the Context Registers 122 within the Context Logic 121 as depicted in step 240 and the context for the next port in the round robin sequence is read from the registers 117 within the context logic 116 and restored. Accordingly, once the context is revised, the port selection pointer selects the next pair of input (TSEG) and output (TXSM) FIFOs 59 and 64 respectively, in a round robin sequence.

Frame Format Transparency

Frame data may be forwarded from the TSEG FIFO 59 to the THP 60 in one of a plurality of three predefined layer 2 header formats depicted in FIG. 7. The THP 60 must be able to determine which of the three formats are being presented for processing. This is accomplished by providing 2 bits in the first Transmit Header Vector longword (THV0) which specify the TSEG header format being employed. The two bits comprises condition codes which are presented to the microsequencer 100. The microsequencer 100 utilizes these two bits in the selection of the translation routine to be performed such that the identification and processing based upon the particular TSEG header format employed does not utilize microsequencer cycles. In this manner, the microsequencer does not utilize unnecessary cycles to accommodate the different TSEG header frame formats employed. While three header formats are employed in the presently disclosed embodiment, it should be appreciated that additional header formats may be employed without deviating from the presently disclosed techniques.

As indicated above, the THP packs frame payload data; i.e. delivers full longwords of data to the TXSM FIFO 64, except for the last longword of the frame. In most of the translation cases in which bytes are added or removed from the frame header, packing a longword for the TXSM FIFO 64 during frame payload transfers will involve taking some of the bytes from one TSEG FIFO 59 longword and the remaining bytes from another TSEG FIFO 59 longword. The offset which specifies the variance from the initial longword boundary is called the byte offset.

By use of the microsequencer 100 to perform frame header translation in the above described manner, a preferred embodiment of a bridge/router employing the presently disclosed THP 60 is capable of processing approximately 4 million frames per second in comparison to bridge/routers which have performed frame header translations in software at rates of only 400–500 thousand frames per second. While the processing engine for the THP has been described as a microcoded microsequencer comprising a microsequencer and a control store, it should be appreciated that any controller may be employed to perform the functions herein described including a state machine or any other suitable high speed processing engine.

It will be apparent to those of ordinary skill in the art that numerous modifications to and variations of the presently disclosed method and apparatus for translating frame headers are possible without departing from the inventive concepts disclosed herein. Accordingly, the invention is not to be viewed as limited to the illustrative embodiment, but rather, is to be viewed as limited solely by the scope and spirit of the appended claims.

What is claimed is:

1. Computer network apparatus having a plurality of input ports and a plurality of output ports and operable to convert a received frame having a received frame header to a transmit frame having a transmit frame header prior to transmission of said frame, said apparatus comprising;

a first controller operable to parse said received frame header to derive a received destination address from said header and to identify the protocol of said received frame;

cache apparatus comprising a cache controller and a cache memory, said first controller operable to forward said received destination address to said cache apparatus;

said cache apparatus operable in response to reception of said received destination address from said first controller:

to compare said received destination address to information stored within said cache memory to provide an indication of whether a match or no match exists between said destination address and said information stored within said cache memory;

to identify selected ones of said plurality of output ports for transmission of said frame and a transmit destination address, in the event said comparison yield a match between said received destination address and said information stored within said cache memory;

to generate an indication of said no match condition, in the event said comparison yields to match between said received destination address and said information stored within said cache memory;

a second controller;

said cache apparatus operable:

to forward to said second controller information comprising said identification of at least one of said plurality of output ports for transmission of said frame and an indication of said match, in the event said comparison yielded said match; and to forward to said second controller information comprising said indication of no match in the event said comparison yielded the indication that no match exists;

said second controller, at least some of the time, operative in response to said information received from said cache apparatus to select further processing of said frame via a first frame forwarding path in the event of a no match condition and a second path which comprises a higher speed frame forwarding path than said first frame forwarding path in the event of said match condition;

said first frame forwarding path including a third controller operative to process said frame in software;

said second path including a fourth controller operative to translate said received frame header to said transmit frame header prior to transmission of said frame from said at least one of said plurality of output ports.

2. The computer network apparatus of claim 1 wherein said fourth controller comprises a high speed frame header translator including a microsequencer and a control store containing a plurality of translation routines for translating frame headers from a selected one of a plurality of received frame header formats to at least one selected one of a plurality of transmit header formats.

3. A method for translating a header of a frame received at an input port of a computer network device for transmission from at least one output port of said computer network device comprising the steps of:

storing within at least one register an indication of a source encapsulation corresponding to a layer 2 encapsulation of the received frame and a transmit encapsulation corresponding to an intended encapsulation to be employed from transmission from said at least one output port;

identifying a microcode location of a translation routine to be applied to said received frame header via use of a dedicated header translation processor which is operative to identify said microcode location in response to said source and transmit encapsulation values stored within said at least one register as a result of said storing step;

executing the translation routine commencing at said identified location to transmit said received frame header to a transmit frame header for forwarding from said at least one output port.

* * * * *

UNITED STATES PATENT AND TRADEMARK OFFICE
CERTIFICATE OF CORRECTION

PATENT NO.   : 5,991,299
DATED        : November 23, 1999
INVENTOR(S)  : Thomas V. Radogna, et al.

It is certified that error appears in the above-identified patent and that said Letters Patent is hereby corrected as shown below:

Column 13, line 3, prior to "The THP", insert the following heading:

—FIFO Round Robin Processing—.

Signed and Sealed this

Fifth Day of June, 2001

*Attest:*

*Attesting Officer*

NICHOLAS P. GODICI

*Acting Director of the United States Patent and Trademark Office*